Aug. 29, 1961     A. A. AMBROSE     2,998,258
ADAPTER FOR LATHE CHUCK AND THE LIKE
Filed March 7, 1960
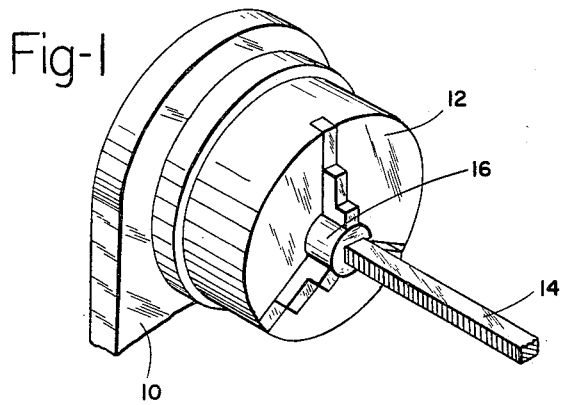
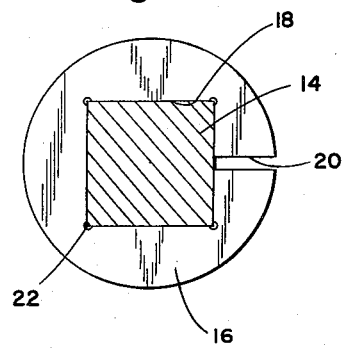
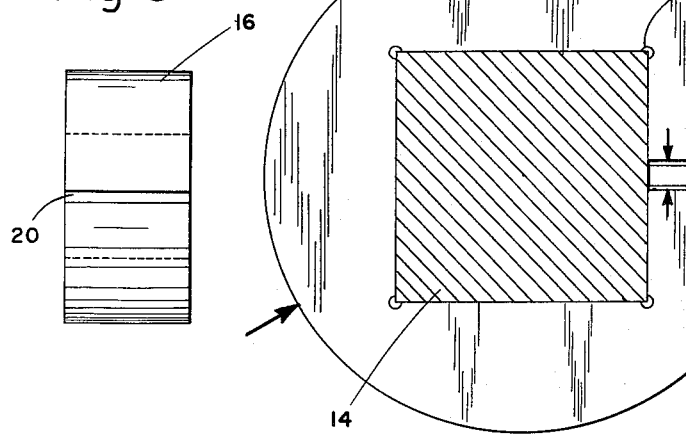
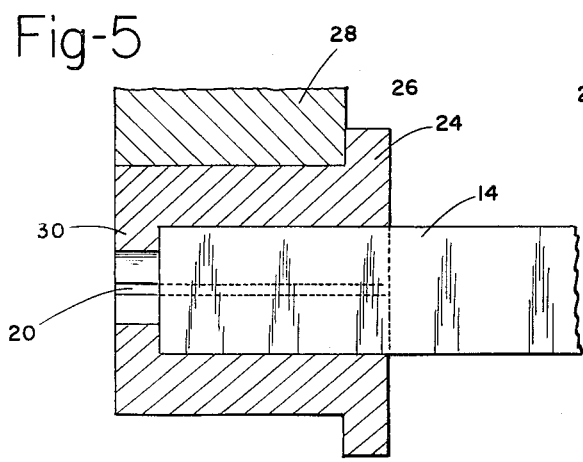
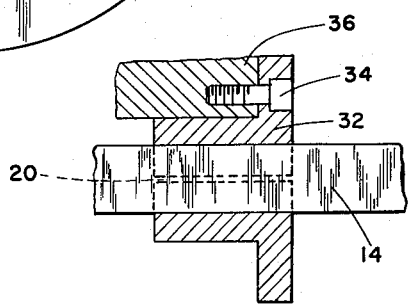
*INVENTOR.*
ANTHONY A. AMBROSE
BY *Toulmin & Toulmin*
ATTORNEYS

United States Patent Office 2,998,258
Patented Aug. 29, 1961

2,998,258
ADAPTER FOR LATHE CHUCK AND THE LIKE
Anthony A. Ambrose, 927 W. 34th Place, Chicago 8, Ill.
Filed Mar. 7, 1960, Ser. No. 13,074
8 Claims. (Cl. 279—41)

This invention relates to an adapter for a chuck such as a lathe chuck and is particularly concerned with an adapter for being utilized in a conventional three-jawed lathe chuck for supporting stock in the chuck in a centered position which would normally be gripped off center by the chuck.

In most cases a lathe in a machine shop provided for general use is provided with a three-jawed chuck. This represents the most conventional and convenient manner of gripping most workpieces because most workpieces will be round and the three-jawed chuck permits ready centering of the workpiece on the work axis of the lathe. In many cases however, work other than round is to be operated, for example, square shafts and the like and under such circumstances the three-jawed chuck as illustrated is adapted for gripping the work so that it is properly centered. Normally, when an odd shaped workpiece of this nature is to be turned the three-jawed chuck is removed and is replaced by a four-jawed chuck so that the work can be gripped in the chuck and centered on the work axis by using an indicator or the like.

Having the foregoing in mind it is a particular object of the present invention to provide an adapter member which can be placed in a three-jawed chuck and which will grip workpieces other than round and hold the workpieces centered in the chuck.

Still another object of this invention is the provision of a simple adapter member that can be availed of for being placed on a polygonal workpiece which will support the workpiece centered in a three-jawed chuck.

Still another object of this invention is the provision of an adapter of the nature referred to which will also provide a stop for the stock when it is inserted into the adapter.

These and other objects and advantages will become more apparent upon reference to the drawings in which:

FIGURE 1 is a fragmentary perspective view showing the head stock end of a lathe with a three-jawed chuck mounted on the spindle and with an adapter member according to the present invention supporting a bar of rectangular stock in the chuck;

FIGURE 2 is a view looking in at the adapter member with the stock mounted therein;

FIGURE 3 is a view looking in from the right side of FIGURE 2;

FIGURE 4 is an enlarged view showing the points of application of pressure to the adapter member by the three-jawed chuck; and FIGURE 5 is a longitudinal sectional view through a modified form of the adapter according to this invention.

FIGURE 6 is a longitudinal sectional view through a modified form of the adapter held in place by one or more screws.

Referring to the drawings somewhat more in detail, FIGURE 1 shows a lathe head stock 10 having a spindle on which is mounted a conventional three-jawed chuck 12. A piece of rectangular or square stock 14 extends into the chuck and an adapter member 16 according to this invention receives the end of the stock and is engaged by the chuck jaws.

As will be seen in FIGURES 2, 3, and 4 the adapter member comprises a piece of metal, preferably hard steel, which is cylindrical in outline and which has a hole 18 therethrough of the same shape as the stock that is to be gripped.

In the particular instance illustrated the stock 14 is square but it will be understood that this is merely a representative cross section through a piece of stock which is other than round.

The adapter member according to the present invention could be utilized for gripping five-sided rods, or other polygonal shapes or configurations that were curved but other than circular such as elliptical or half round or the like.

The hole in the adapter member would be located so that the workpiece would be supported with the desired center of rotation thereof centrally located with regard to the circular outside surface of the adapter member.

The adapter member is provided with a slot 20 extending through one side wall thereof so that the adapter member will close inwardly about the piece to be gripped thus accurately centering the piece and holding it tightly while it is being operated.

Preferably, where the adapter member has a polygonal interior or where a straight surface terminates the point where the straight surface joins with the adjacent straight or curved surface is provided with a small recess 22 extending through the adapter member. The provision of such a recess facilitates in providing for definite regions of yieldability of the adapter member so that when it closed upon the object to be gripped thereby, the gripping surface inside the adapter member will not be deformed.

Inasmuch as the adapter member is preferably made of a fairly hard steel, or is case hardened, it can be made so that it is slightly sprung open so the aperture or hole therein freely receives the work member to be supported in the adapter member and then the adapter member closes in tightly about the work member when the chuck is operated and exerts radial force on the adapter member at spaced points thereabout.

As will be seen in FIGURE 5, an adapter member 24 could be provided with a flange 26 on the outside to engage either the jaws 28 of the chuck or the body of the chuck thus accurately locating the adapter member and preventing the adapter member from being pushed through the chuck, and there could also be provided inwardly extending flange means 30 at the inner end of the adapter to provide a stop for a work member inserted into the adapter member. Such an arrangement would facilitate the use of the adapter member in case it were employed in a production run which might be the case if the production run were of short duration or was intermittently carried out.

Further, as will be seen in FIGURE 6, the adapter member according to this invention could be arranged for being attached to the body of the chuck or to the chuck jaws whereby stock could be fed through a hollow spindle from the back and the adapter member would not become dislodged.

In FIGURE 6 the adapter member is indicated at 32 and it is held in place by one or more screws 34 extending through flange means 36 on the outside of the adapter member.

In any case, the present invention provides an easy means for gripping workpieces other than circular in a conventional three-jawed chuck, and this can be accomplished very quickly and by workmen of ordinary skill. The workpiece will be accurately centered on the work axis of the lathe of the turning machine and will be tightly gripped in the three-jawed chuck without any lost motion and without any slippage.

It will be evident that there will be times when the stock may be slightly off size and in such a case the present invention can readily be practiced by utilizing shims between the workpiece and the inside of the chuck.

It will be understood that this invention is susceptible to modification in order to adapt it to different usages and conditions; and accordingly, it is desired to comprehend such modifications within this invention as may fall within the scope of the appended claims.

I claim:

1. An adapter member for gripping and locating non-circular work members in a lathe chuck comprising; a member circular in cross section, a hole through said member having the same cross sectional shape as the workpiece to be gripped thereby, and a slot in the side of said member whereby the application of pressure to points spaced uniformly about the outside of said member will compress it about a workpiece extending into the hole therein.

2. An adapter member for supporting a workpiece which is other than circular in cross section in a three-jawed lathe chuck which comprises; a member having a cylindrical outer surface, a hole through the member having the same cross sectional shape as the workpiece to be supported therein, said hole being located in the member with respect to the said cylindrical outer surface so as to support the workpiece with its desired axis of rotation coinciding with the central axis of said member, and a slot through said member extending from said hole to the outer surface whereby the application of pressure to points spaced uniformly about the outer surface of said member will cause it to engage a workpiece therein in gripping relation.

3. In an adapter member for supporting polygonal stock in a three-jawed chuck; a metallic member cylindrical on its outer surface, a polygonal hole through the member, the axis of the polygonal hole coinciding with the axis of said outer surface, and a slot through the wall of said member extending from said hole to the outer surface whereby the member can be compressed about a workpiece placed in the hole by the application of pressure to points spaced uniformly about the member.

4. In an adapter member for supporting polygonal stock in a three-jawed chuck; a metallic member cylindrical on its outer surface, a polygonal hole through the member, the axis of the polygonal hole coinciding with the axis of said outer surface, and a slot through the wall of said member extending from said hole to the outer surface whereby the member can be compressed about a workpiece placed in the hole by the application of pressure to points spaced uniformly about the member, said member being sprung outwardly slightly so as to permit easy insertion of the workpiece in the hole so that when the member is compressed by the chuck jaws into gripping engagement with the workpiece, the several surfaces of the polygonal workpiece will be engaged by the several surfaces of said hole.

5. In an adapter member for supporting rectangular stock in a three-jawed chuck, a metal cylinder, a rectangular hole extending through the member on the axis thereof, a slot extending through the member from the hole out to the outer surface so the member is resilient for springing open to receive a piece of rectangular stock and for being pressed inwardly by the chuck to grip the stock by the application of pressure to points spaced uniformly about the member, and grooves extending through the member at the intersection of the several surfaces of the hole.

6. In an adapter member for gripping non-circular stock in a three-jawed chuck; a metal member having a cylindrical outer surface, a hole formed through said member of the same cross sectional shape as the workpiece to be mounted therein, a slot extending through said member from end to end and from the hole to the outer surface so the member is resilient and can be pressed by the chuck into gripping relation with the surface of a workpiece placed therein by the application of pressure to points spaced uniformly about the member, and flange means extending inwardly at one end of the member forming a stop for workpieces inserted into the member from the other end.

7. In an adapter member for gripping non-circular stock in a three-jawed chuck; a metal member having a cylindrical outer surface, a hole formed through said member of the same cross sectional shape as the workpiece to be mounted therein, a slot extending through said member from end to end and from the hole to the outer surface so the member is resilient and can be pressed by the chuck into gripping relation with the surface of a workpiece placed therein by the application of pressure to points spaced uniformly about the member, and flange means extending inwardly at one end of the member forming a stop for workpieces inserted into the member from the other end, said adapter member also having flange means extending outwardly at the said other end for engagement with the chuck in which it is mounted to locate the adapter member in the chuck.

8. In an adapter member for supporting non-circular stock in a lathe chuck; a metallic member having a cylindrical outer surface for engagement with the chuck jaws, said member having a hole extending therethrough of the same cross sectional shape as the workpiece to be gripped thereby, a slot extending through the adapter member from end to end and from the hole to the outer surface of the adapter member whereby the adapter member is resilient and can be compressed by the chuck into gripping relation with a workpiece in the outer member by the application of pressure to points spaced uniformly about the member, said adapter member having flange means projecting outwardly from the cylindrical outer surface engageable with the chuck in which it is mounted, and means attaching the outer member to the chuck so that a workpiece can be manipulated in the adapter member without changing the position of the adapter member.

References Cited in the file of this patent

UNITED STATES PATENTS

| | | |
|---|---|---|
| 1,473,188 | Kramp | Nov. 6, 1923 |
| 2,686,058 | Zetterberg | Aug. 10, 1954 |
| 2,757,008 | Lane | July 31, 1956 |